United States Patent
Agapi et al.

(10) Patent No.: US 7,787,598 B2
(45) Date of Patent: Aug. 31, 2010

(54) METHOD AND SYSTEM FOR AUTOMATIC GENERATION AND TESTING OF VOICE APPLICATIONS

(75) Inventors: Ciprian Agapi, Lake Worth, FL (US); Michael H. Mirt, Deerfield Beach, FL (US); Charles Sumner, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1430 days.

(21) Appl. No.: 11/170,120

(22) Filed: Jun. 29, 2005

(65) Prior Publication Data

US 2007/0003037 A1 Jan. 4, 2007

(51) Int. Cl.
*H04M 1/24* (2006.01)
*H04M 3/08* (2006.01)
*H04M 3/22* (2006.01)

(52) U.S. Cl. .............. 379/10.03; 379/27.04; 379/29.02; 704/270

(58) Field of Classification Search ................ 379/1.01, 379/10.01, 10.03, 26.01, 27.04, 29.02, 10.02; 704/220, 256.3, 258, 270, 270.1
See application file for complete search history.

(56) References Cited

U.S. PATENT DOCUMENTS

| | | | |
|---|---|---|---|
| 5,572,570 A | 11/1996 | Kuenzig | |
| 6,504,905 B1 | 1/2003 | Tsai et al. | |
| 2002/0077819 A1* | 6/2002 | Girardo | 704/260 |
| 2003/0212561 A1 | 11/2003 | Williams et al. | |
| 2005/0091057 A1* | 4/2005 | Phillips et al. | 704/270.1 |
| 2006/0224392 A1* | 10/2006 | Kershaw et al. | 704/270.1 |

* cited by examiner

*Primary Examiner*—Quoc D Tran
(74) *Attorney, Agent, or Firm*—Wolf, Greenfield & Sacks, P.C.

(57) ABSTRACT

A method (100) and system (30) to enable automatic generation and testing of voice applications includes generating (102) a test driver application (TDA) (32) and generating (104) a modified original voice application (34) to be tested by the TDA within a call flow builder (10). The modified application can include or generate (106) "test hooks" or more particularly DTMF tones and DTMF grammars that can be used to synchronize the modified original voice application with the TDA. The TDA can test (110) all possible paths of the modified original voice application. Note the TDA and the modified original voice application can be generated and/or tested (112) in a test environment within the call flow builder or a telephony environment. The TDA can be automatically generated (108) to exercise all possible flows where the DTMF tones define the current state and location of the modified application.

20 Claims, 8 Drawing Sheets

```xml
<?xml version="1.0" encoding="UTF-8"?>
 <ccxml xmlns="http://www.w3.org/2002/09/ccxml"
    xmlns:xsi="http://www.w3.org/2001/XMLSchema-instance"
    xsi:schemaLocation="http://www.w3.org/2002/09/ccxml
    http://www.w3.org/TR/ccxml/ccxml.xsd" version="1.0">

<var name = "currentState" expr="'starting'"/>
    <var name = "count" expr = "0"/>

<eventprocessor statevariable="currentState">
        <transition state ="starting" event= "ccxml.loaded">
                <createconference conferenceid = "test_driver"/>
                <dialogstart connectionid = "test_driver" src = "http://www.testapp.com/testapp.vxml"/>
                <dialogstart connectionid = "test_driver" src = "http://www.testapp.com/OVADH.vxml"/>
                <assign name="count" expr="count+2"/>
                <assign name = "currentState" expr = "'testing_apps'" />
        </transition>

<transition state = "testing_apps" event = "dialog.exit" >
                <assign name="count" expr="count-1"/>
                <if cond = "count == 0">
                            <destroyconference conferenceid = "test_driver"/>
                        <exit/>
                </if>
        </transition>
    </eventprocessor>
</ccxml>
```

METHOD AND SYSTEM FOR AUTOMATIC GENERATION AND TESTING OF VOICE APPLICATIONS

BACKGROUND OF THE INVENTION

1. Technical Field

This invention relates to the field of testing speech applications and more particularly to a method and system for automatically testing speech applications.

2. Description of the Related Art

When attempting to test speech applications "automatically", a test application is typically developed by hand. More recently, graphic user interface (GUI) based tools (Hammer IT test system for instance) allow a more rapid test application generation. Even with such GUI based tools (such as Hammer), there is a laborious, time-consuming manual setup of the test tool to mirror the application to be tested. The process is laborious since the GUI based tools has to mimic all potential paths available in a voice application, and additionally requires extra human verification. Furthermore, when application flow changes are made, most likely required changes must be made to the test application.

SUMMARY OF THE INVENTION

Embodiments in accordance with the invention can include a new method and system that enables the automatic generation of a test application that will functionally verify a voice application generated originally with a call flow builder (which is a speech IDE Integrated Development Environment). The automatically generated test application can exercise all possible flows available to a caller in the original voice application using a modified version of the original voice application. This approach eliminates the manual verification of the test application and minimizes the time for generating the test application resulting in enormous time savings in testing all logical paths of the application.

In a first embodiment in accordance with the invention, a method for automatic generation and testing of voice applications can include the steps of generating a test driver application (TDA), and generating a modified original voice application to be tested by the test driver application within a call flow builder. The modified original voice application can include or generate "test hooks" or more particularly dual tone modulated frequency (DTMF) tones (called original voice application with DTMF hooks—OVADH from here on), that can be used to synchronize the modified original voice application with the test driver application. The test driver application (TDA) consists of the test application with the DTMF hooks, and additionally a test control module. The test control module serves the purpose of spawning the test application and the voice application with DTMF hooks and conference in the 2 applications. Depending on the test environment, the test control module can be embedded programmatically in the speech IDE in the call flow builder test environment, or can consist of a CCXML application that is automatically generated together with the TDA, for the telephony test environment. The system can further include a method using the test driver application to test all possible paths of the modified original voice application. Note the test driver application and the modified original voice application can be generated in the call flow builder environment, and tested in a telephony or the call flow builder environments. The test driver application can be automatically generated to exercise all possible flows available to a caller in an original voice application where the DTMF tones define the current state and location of the modified original voice application and the test driver application simulates a caller and is directed by DTMF tone sequences received from the modified original voice application to solicit a desired response from the test driver application.

In a second embodiment in accordance with the invention, a system for automatically generating and testing a voice application can include a test driver application and a modified version of the voice application that generates DTMF tones wherein the test driver application tests all possible paths of the modified version of the voice application within a call flow builder. The test driver application and the modified version of the voice application can be generated and tested in a telephony or a test environment within the call flow builder. The test driver application can be automatically generated to exercise all possible flows available to a caller in an original voice application where the DTMF tones define the current state and location of the modified version of the voice application. Note, the test driver application simulates a caller and is directed by DTMF tone sequences received from the modified version of the voice application to solicit a desired response from the test driver application. The testing of the test driver application and the modified original application with DTMF test hooks can be coordinated programmatically by the test IDE, or in case of the telephony testing, through the CCXML program automatically generated.

In other aspects of the invention, a computer program having a plurality of code sections executable by a machine for causing the machine to perform certain steps is described. The steps can generally include the steps outlined in the first and second embodiments described above.

BRIEF DESCRIPTION OF THE DRAWINGS

There are shown in the drawings embodiments which are presently preferred, it being understood, however, that the invention is not limited to the precise arrangements and instrumentalities shown.

FIG. 6 is a programmatic representation of the Test Control Module (TCM) represented in FIG. 5.

DETAILED DESCRIPTION OF THE INVENTION

Embodiments in accordance with the invention can provide a modified voice original voice application based on the original voice application using a call flow builder that will automatically provide two additional outputs. The first output is essentially the original voice application with DTMF test hooks (OVADH). The second output is the test driver application (TDA). The test hooks which are added to the original voice application can include DTMF tone sequences which will define the current state and location in the voice application. These tones can be played at points in the voice application to solicit a desired response from the test driver application.

The test driver application (TDA) can simulate a caller, and consists of a test application with DTMF hooks, and additionally a test control module. The test control module serves the purpose of spawning the test application and the voice application with DTMF hooks and conference in the 2 applications. Depending on the test environment, the test control module can be embedded programmatically in the speech IDE in the call flow builder test environment, or can consist of a CCXML application that is automatically generated together with the TDA, for the telephony test environment.

The test application can be directed by the DTMF tone sequences received from the voice application. Based on the DTMF tones received, the test application can determine at what point the voice application is currently at and play an appropriate response via text-to-speech (TTS) or recorded speech.

Once the original voice application with DTMF test hooks (i.e., the modified application) and test driver applications (the test application and the CCXML application for the telephony environment) have been generated they are immediately ready for testing. There is no delay for driver application development, setup and verification. Also eliminated is the manual process for adding test hooks to the original voice application. Thus, turn-around test time can be minimized by automatically generating the test driver and voice application with DTMF test hooks.

Figure 1:
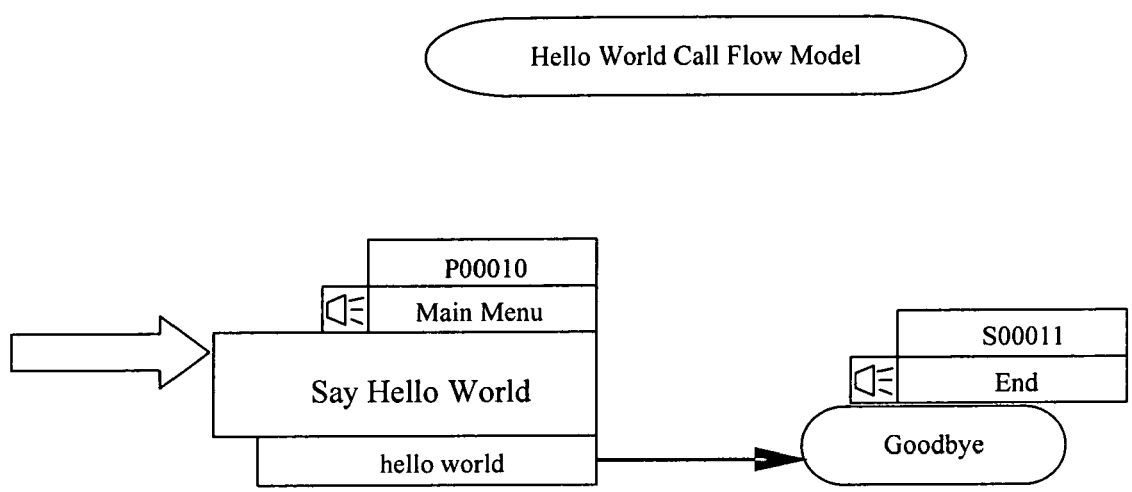
FIG. 1 is a "Hello World" application created in a call flow builder/speech integrated development environment IDE.

With reference to FIG. 1, using VXML and the integrated development environment IDE, the traditional "Hello World" simple VXML application can be generated/built to elicit a caller response.

Figure 2:
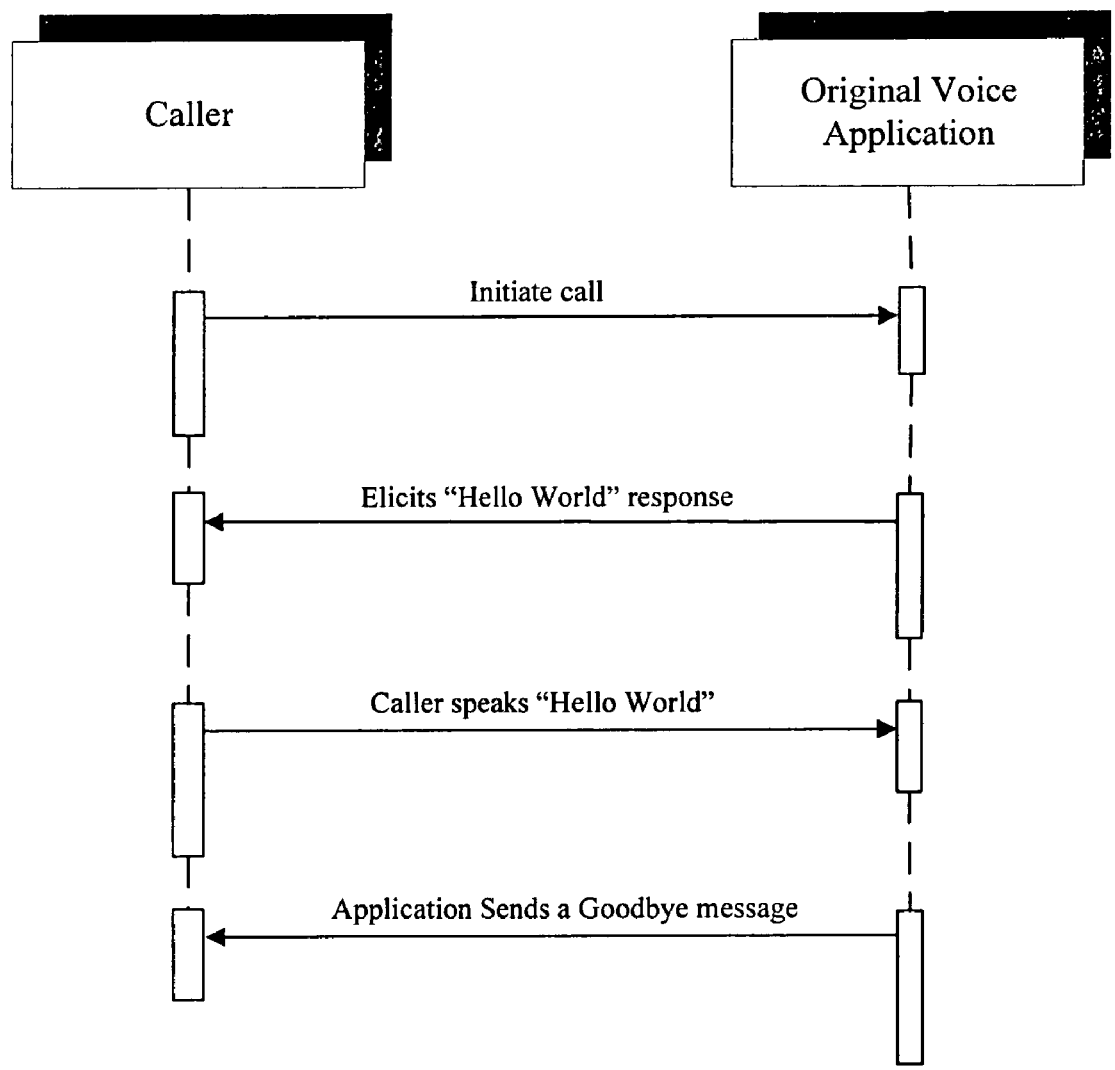
FIG. 2 is a sequence diagram illustrating an existing interaction between a caller and the Hello World voice application represented in FIG. 1.
Figure 3:
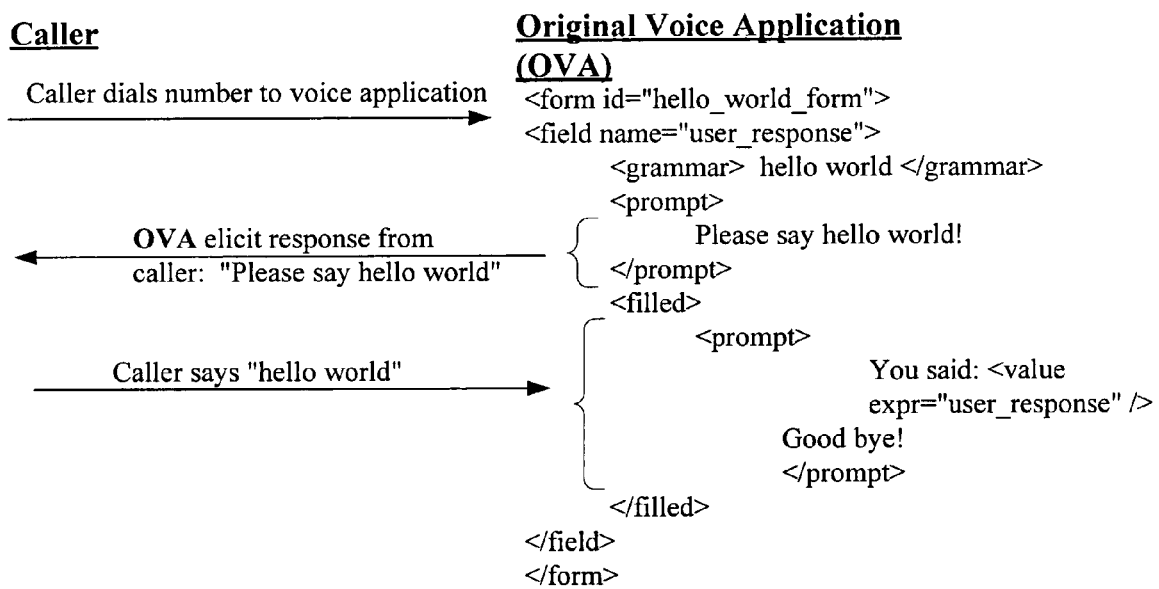
FIG. 3 is a programmatic representation of the flow diagram of FIG. 2.

With reference to FIG. 2, using a UML sequence diagram 10, the interaction between the original voice application that will greet the caller, and ask the caller to speak "Hello World". The caller then responds and the application will say goodbye and terminate the call. Using VXML, the interaction is depicted as shown in FIG. 3.

Figure 4:
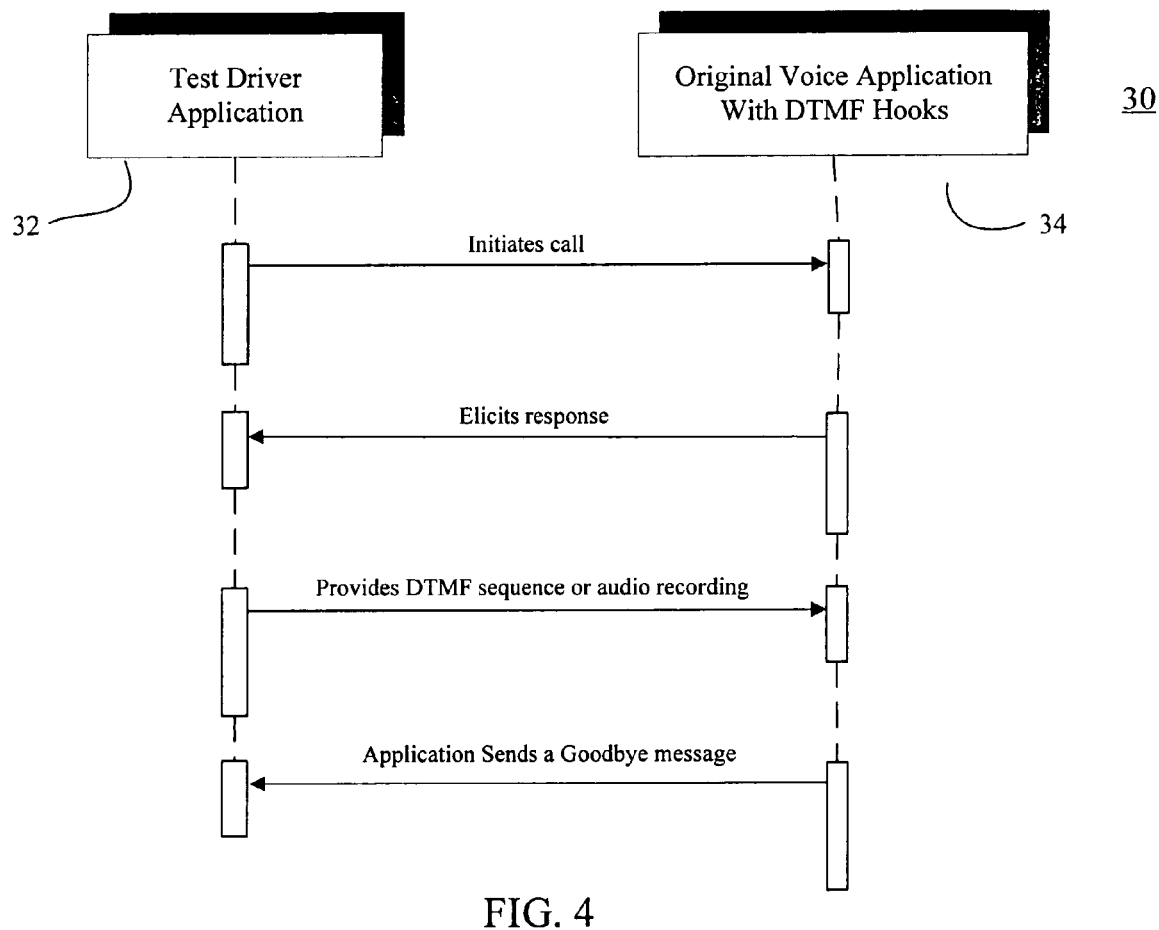
FIG. 4 is a flow diagram illustrating an interaction between a test driver application and a modified original voice application with DTMF hooks in accordance with an embodiment of the present invention.
Figure 5:
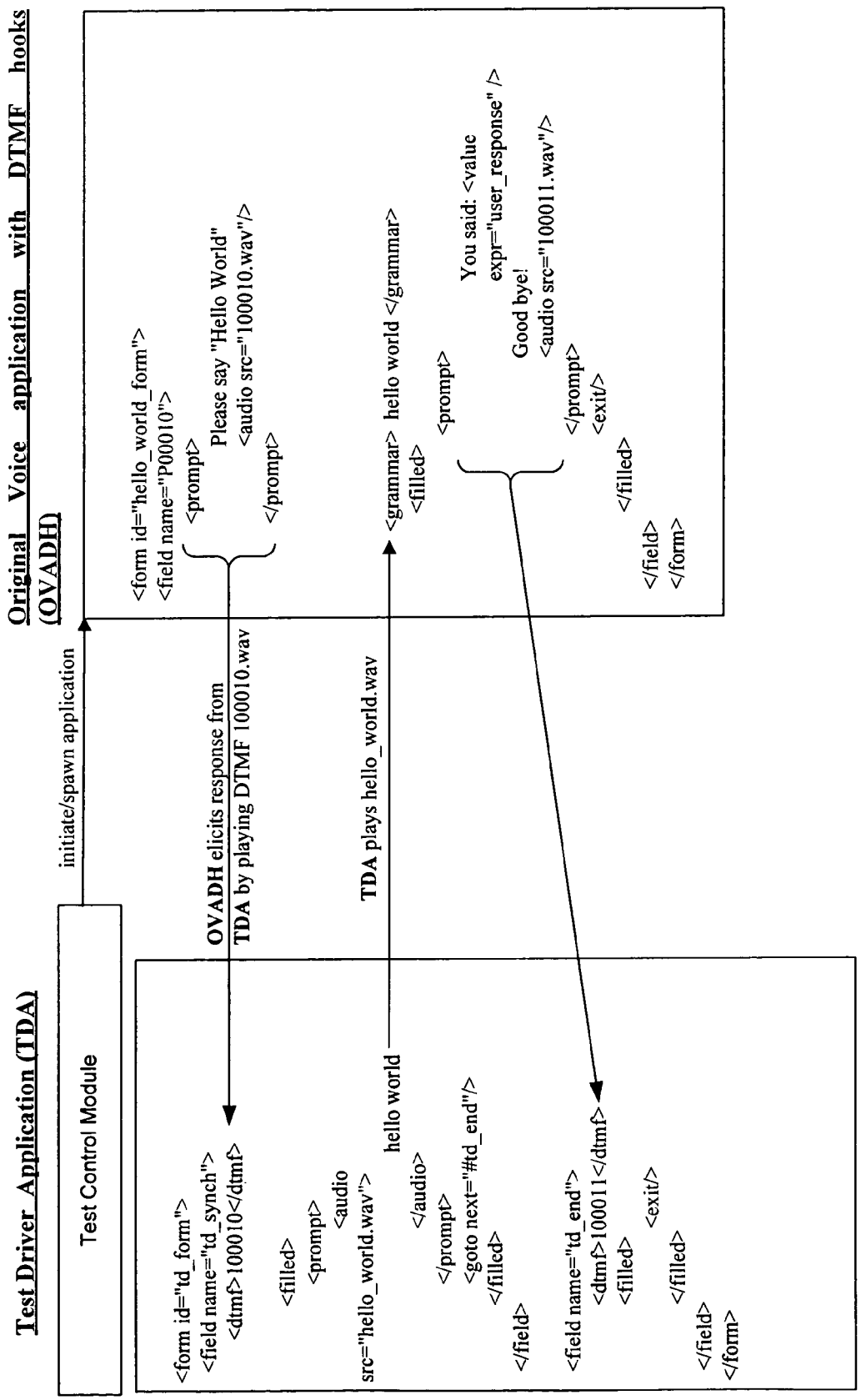
FIG. 5 is a programmatic representation of the flow diagram of FIG. 3.

Referring to FIG. 4, once the original application (shown in FIG. 3) has been generated, with a simple command (right click/generate autotester for example) within a call flow builder (shown in FIG. 1) 10, two additional independent applications can be generated that will "talk" to each other automatically. The first application can be a Test Driver Application (TDA) 32 that will drive the corresponding (modified) voice or speech application. The second application is the modified original application 34 with "test hooks". A new application will be generated based on the original voice application in which DTMF "test hooks" have been inserted. These "test hooks" provide the necessary information to do a handshake with the TDA 32. The automatic "conversation" between the TDA 32 and the application 34 with "test hooks" can be initiated by the Test Control Module (TCM). Using VXML, the dialog can appear as shown in FIG. 5. Note that any expected response from the test driver can be first recorded for example as a .wav file, and sent back to the original application with test hooks in this format. Also, these recordings can be actual utterances of callers, using the original voice application. In the above example shown in FIG. 5, HelloWorld.wav can be generated automatically by sending "hello world" as a string to the TTS engine and recording the output. Also note, besides the TDA 32 responding to the modified original application 34 with either TTS or prerecorded WAV content, the TDA 32 can also be instructed to issue premature replies (with TTS or WAV content) to simulate Barge-In. This capability adds to the existing human-like interaction of the TDA 32.

Referring to FIG. 6 a programmatic representation of the Test Control Module (TCM) for the telephony environment is represented as a CCXML application. The CCXML application spawns the test application and the original application with DTMF hooks, and conferences them in to "talk" to each other.

Figure 7:
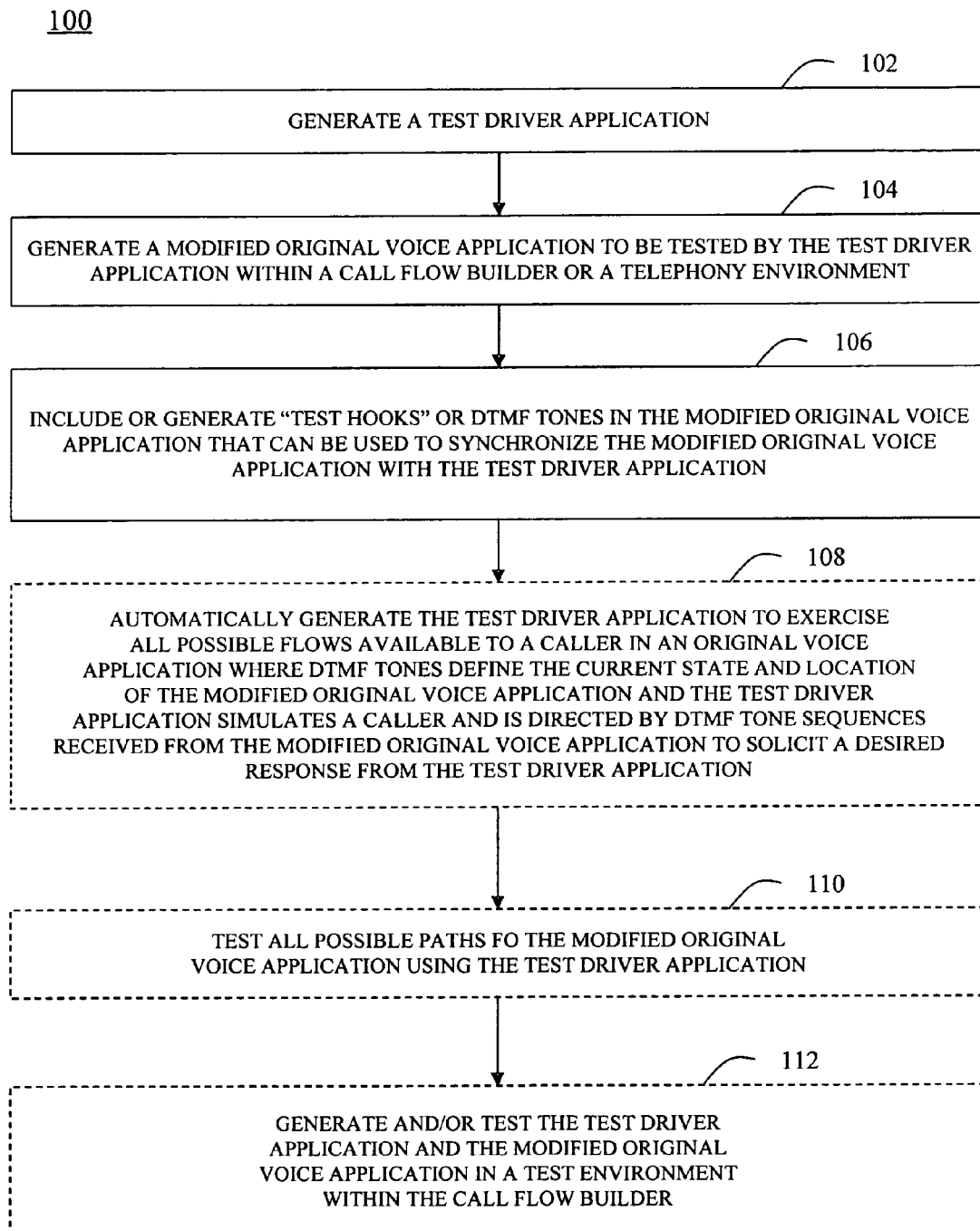
FIG. 7 is a flow chart illustrating a method for enabling automatic generation and testing of voice applications in accordance with an embodiment of the present invention.

Referring to FIG. 7, a flow chart illustrating a method 100 to enable automatic generation and testing of voice applications can include generating a test driver application at step 102 and generating a modified original voice application to be tested by the test driver application within a call flow builder or within a telephony environment at step 104. Step 102 includes the creation of the test application that will communicate with the modified original application and optionally for the telephony environment, a test control module TCM. The modified original voice application can include or generate "test hooks" or more particularly dual tone modulated frequency (DTMF) tones and DTMF grammars as shown at step 106 that can be used to synchronize the modified original voice application with the test driver application using the DTMF tones. The method 100 can further include the optional step 110 of using the test driver application to test all possible paths of the modified original voice application. Note the test driver application and the modified original voice application can be generated and/or tested at step 112 in a test environment within the call flow builder, or in a telephony environment. As shown at step 108, the test driver application can be automatically generated to exercise all possible flows available to a caller in an original voice application where the DTMF tones define the current state and location of the modified original voice application and the test driver application simulates a caller and is directed by DTMF tone sequences received from the modified original voice application to solicit a desired response from the test driver application.

A complete test of the application is performed if the expected paths of the application are the same as the actual paths tested:

$$E(Pe)=P_{actual}$$

Figure 8:
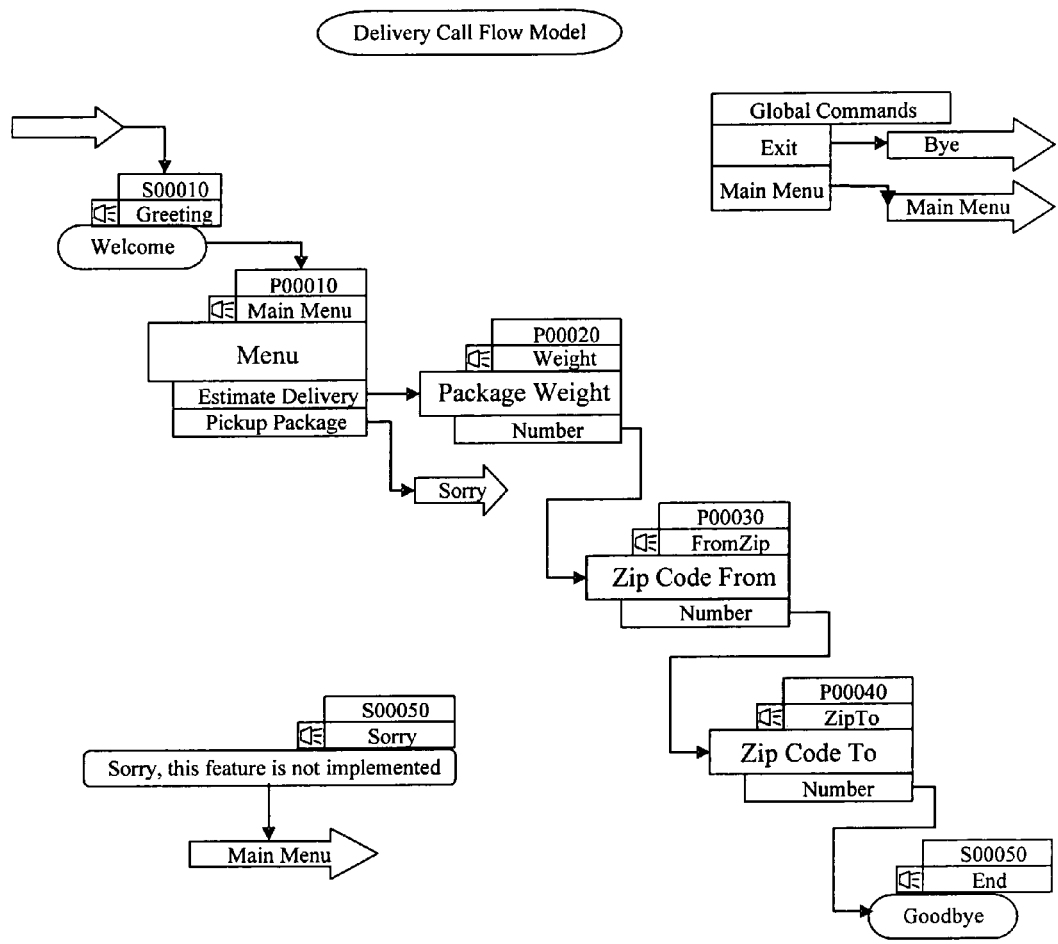
FIG. 8 is a call flow diagram highlighting grammar problems in accordance with an embodiment of the present invention.

The missing paths highlight grammar problems illustrated in the delivery call flow model 200 of FIG. 8. A complete test of an application can be done by logging all the interactions between the test driver application and the original application with DTMF test hooks, and then analyzing & comparing the expected paths in the application. The callflow builder can automatically generate identifiers for all points in the callflow (e.g. S00010). Based on these identifiers, for example, the application shown in FIG. 8 has as expected paths:

$$E(Pe)=\{(S00010, P00010, P00020, P00030, P00040, S00050), (S00010, P00010, S00040)\}$$

In one embodiment during automatic testing, the modified application can signal at what point it is using DTMF tone and can further provide the possible input combinations. The DTMF used for synchronization should be derived from the actual callflow. For example in the call flow presented in FIG. 8, the DTMF tones sent to the test driver application are: 100010, 100020, 100030, 100040. Using DTMF grammars, the test driver application will "know" based on the DTMF sent what the next test point (prompt) should be. On top of the "location signaling" which in the callflow builder example 200 is represented by 6 digits prompts (100010), additional possible actions can be signaled. For example the next 3 DTMF inputs can represent the possible responses to be provided next. For example, a DTMF value of 100 can mean that no response could be expected. A 211 can mean no response or a .wav file could be played, where the 11 DTMF of the 211 can be the actual file to be played to the application. Combining the location and the possible responses DTMF signaling, the P00010 prompt could have "100010211" as its synchronization signaling.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for automatic generation and testing of voice applications, comprising the steps of:
   generating a test driver application; and
   generating a modified original voice application to be tested by the test driver application within a call flow builder, the modified original voice application comprising at least one test hook that allows the test driver application to acquire information regarding a state of the modified original voice application.

2. The method of claim 1, wherein the step of generating the modified original voice application comprises generating the modified original voice application so that the at least one test hook generates DTMF tones to allow the test driver application to acquire the information.

3. The method of claim 2, wherein the method further comprises the step of synchronizing the modified original voice application with the test driver application using the DTMF tones.

4. The method of claim 1, wherein the method further comprises the step using the test driver application to test all possible paths of the modified original voice application.

5. The method of claim 1, wherein the test driver application simulates barge-in by being instructed to issue premature replies using at least one among text-to-speech content and prerecorded content.

6. The method claim 1, wherein the test driver application and the modified original voice application are generated and tested in the test environment within the call flow builder or in a telephony environment.

7. The method of claim 1, wherein the automatically generated test driver application can include a control application to be used in a telephony environment.

8. The method of claim 1, wherein the test driver application is automatically generated to exercise all possible flows available to a caller in an original voice application.

9. The method of claim 2, wherein the DTMF tones define the current state and location of the modified original voice application and further provides possible input combinations.

10. The method of claim 1, wherein the test driver application simulates a caller and is directed by DTMF tone sequences received from the modified original voice application to solicit a desired response from the test driver application.

11. A system for automatically generating and testing a voice application, comprising:
    a test driver application; and
    a version of the voice application that is modified to generate DTMF tones providing information indicative of a state of the modified version of the voice application, wherein the test driver application tests all possible paths of the modified version of the voice application within a call flow builder.

12. The system of claim 11, wherein the test driver application and the modified version of the voice application are generated and tested in a test environment within the call flow builder.

13. The system of claim 11, wherein the test driver application is automatically generated to exercise all possible flows available to a caller in an original voice application.

14. The system of claim 11, wherein the DTMF tones define the current state and location of the modified version of the voice application.

15. The system of claim 11, wherein the test driver application simulates a caller and is directed by DTMF tone sequences received from the modified version of the voice application to solicit a desired response from the test driver application.

16. A machine-readable storage, having stored thereon a computer program having a plurality of code sections executable by a machine for causing the machine to perform the steps of:
    generating a test driver application; and
    generating a modified original voice application to be tested by the test driver application within a call flow builder, the modified original voice application comprising at least one test hook usable by the test driver application to acquire information regarding a state of the modified original voice application.

17. The machine readable storage of claim 16, wherein the computer program further comprises code sections for causing the modified original voice application to generate DTMF tones for synchronizing the modified original voice application with the test driver application.

18. The machine readable storage of claim 16, wherein the computer program further comprises code sections for testing all possible paths of the modified original voice application using the test driver application.

19. The machine readable storage of claim 16, wherein the computer program further comprises code sections for automatically generating the test driver application to exercise all possible flows available to a caller in an original voice application.

20. The machine readable storage of claim 16, wherein the computer program further comprises code sections that simulate a caller and is directed by DTMF tone sequences received from the modified original voice application to solicit a desired response from the test driver application.

* * * * *